United States Patent [19]
Grau et al.

[11] Patent Number: 5,718,270
[45] Date of Patent: *Feb. 17, 1998

[54] DEVICE FOR COUPLING CONTAINERS

[75] Inventors: Gerhard Grau, Müllheim/Baden; Martin Koch, Neuenburg/Baden; Günter Untch, Müllheim, all of Germany

[73] Assignee: Buck Werke GmbH & Co., Bad Ueberkingen, Germany

[ * ] Notice: The term of this patent shall not extend beyond the expiration date of Pat. No. 5,549,266.

[21] Appl. No.: 660,426

[22] Filed: Jun. 7, 1996

[30] Foreign Application Priority Data

Jun. 9, 1995 [DE] Germany .................. 195 20 409.3

[51] Int. Cl.[6] ............................................ F16L 37/28
[52] U.S. Cl. .................... 141/383; 141/93; 141/346; 141/351; 141/353
[58] Field of Search ................. 141/93, 346, 351, 141/353–355, 383

[56] References Cited

U.S. PATENT DOCUMENTS

| | | | |
|---|---|---|---|
| 3,729,030 | 4/1973 | Brissenden | 141/383 X |
| 5,246,041 | 9/1993 | Wiess | 141/93 X |
| 5,262,578 | 11/1993 | Hall | 141/93 X |
| 5,322,095 | 6/1994 | Bolz | 141/93 X |
| 5,490,546 | 2/1996 | Lhoest | 141/346 |
| 5,540,266 | 7/1996 | Grau et al. | 141/383 |

Primary Examiner—J. Casimer Jacyna
Attorney, Agent, or Firm—Hill, Steadman & Simpson

[57] ABSTRACT

A device for coupling two containers comprising connecting branches having essentially circular cross section, with each of the connecting branches having a closing member at one end, which is essentially circular in cross section, for closing the end facing away from the container. When the two connecting branches are brought together, the two closing members are combined into a single member moved by a single actuator so that no clearance is required in each of the branches between the ends of the branch and the member. Each of the branches has annular edge seals, which, in an uncompressed condition, engage a circumferential edge of each of the closing members and are compressed when engaged with the edge seal of the adjacent branch member to release the respective closing member. The edge seals coact to form a butt chamber and one of the branch connections has a circumferential sealing sleeve into which the other of the branch connections is inserted in a sealing fashion when forming a connection between the two branch connections.

11 Claims, 3 Drawing Sheets

DEVICE FOR COUPLING CONTAINERS

BACKGROUND OF THE INVENTION

The present invention is directed to a device for coupling two containers which respectively have connecting branches or necks having an essentially circular cross section and with each of the branches or necks comprising a closing flap or member having an essentially circular cross section that is close to the end facing away from the container that carries it. The closing flap or member is pivotable by essentially 90° around an axis extending perpendicular to a center axis of the branch and will have an outside diameter that essentially corresponds to the inside diameter of the connecting branch so that it can be moved with a valve actuator from a closed position wherein it resides essentially transverse relative to the longitudinal middle axis of the branch into an open position wherein it resides essentially parallel to the longitudinal middle branch of the particular connecting branch.

Allowed U.S. patent application Ser. No. 08/355,690, whose disclosure is incorporated herein by reference thereto and which claims priority from German Application 43 42 962, discloses a device of this type, which has proven very effective in practice. As disclosed, each of the closing members has a semiaxle which is mounted in two bearing shells that lie opposite one another and are complimentary with the respective semiaxle and open toward an end face of the connecting branch. The end faces are aligned in the closed position with the end faces of the other connecting branch and are seated therein with the respective semiaxles essentially shaped in cross section like a semi-circular sector or cross section, whose planar end faces face away from the container that carries the respective connecting branch. Only one of these semiaxles can be directly engaged by a valve actuator, and after the end faces of the connecting branches have been pressed against one another in a centered fashion, both closing members will engage each other to form a combined member so that the second member is entrained with the first closing member and both members are pivoted in the bearings formed by the two bearing shells between their closed position and their opened position.

As disclosed in this application, each of the closing members is respectively seated in an essentially circular sealing bead having a cross sectional configuration that, in the condition wherein the allocated closing member is closed and the other connecting piece is not pressed thereagainst, the circular ring-shaped end face of the respective connecting branch is covered by the sealing bead so that it tightly bears on a periphery of the closing member at the same time as a face sealing surface that faces away from the connecting branch and ascends obliquely radially outward in a direction toward the other connecting branch to be connected. When the two connecting branches are pressed together and seal the joint with the sealing end faces, the region of both sealing beads approximate to the sealing surface are pressed radially outward and release the closing flap or member for pivoting so that the cylindrical cross section remains and the gap between the closing member is reliably closed.

As disclosed, a blower means for charging a butt or joint chamber is formed together between the closing members being pressed against each other with a cleaning gas and/or protective atmosphere and also includes an extraction chamber surrounding the butt chamber.

SUMMARY OF THE INVENTION

The present invention is directed to an object of improving the device or apparatus and to effect that the cleaning of the closing flaps or members before and/or after the filling event to be accomplished with the apparatus is improved by forming or, respectively, opening of a butt chamber that begins earlier and ends later, This object is inventively achieved by an improvement in a device for coupling two containers to transfer the contents therebetween, said device including a separate connecting branch having essentially a circular cross section for each of the containers, each connecting branch having a closing member having an essentially circular cross section being located adjacent to an end of the connecting branch and having an outside diameter essentially corresponding to the inside diameter of the connecting branch, each closing member being rotatable through 90° on an axis extending transverse to the central axis of the branch from a closed position, wherein the closing member essentially extends transversely relative to the longitudinal middle axis of the connecting branch to an opened position where it is essentially parallel to the longitudinal middle axis of the connecting branch, each of the closing members having a semiaxle being seated in two bearing shells lying opposite one another and complimentary with respect to the semiaxle that opens toward the end face of the respective connecting branch, said end faces being aligned in a closed position with the end face of the respective connecting branch and being seated therein with the respective semiaxle, which has an essentially semi-circular cross section, with planar end faces which face away from the container carrying the respective connecting branch and are essentially aligned with the end faces of the closing member facing away from the container, only the first of the two semiaxles being directly engaged by a valve actuator and with the end faces of the connecting branches being pressed against one another in a centered fashion with the closing members being formed into a combined closing member, the second closing member not directly driven being entrained to pivot in the bearings formed by the bearing shells and being pivotable between the closed position and opened position with the first closing member connected to the valve actuator, each of the connecting branches being terminated in an annular edge seal which are constructed so that when the branches are spaced from one another, the seal engages a periphery of the closing member and when the two branches are abutted against each other, the seals release each of the closing members, the device includes at least one of the closing members being provided with blower means for charging a chamber formed between the closing flaps as they are being pressed against one another for providing a cleaning and/or protective gas and the blower means further including extraction means for collecting the cleaning and/or protective gas directed into the chamber allocated therefor. The improvements include one of the two connecting branches having a circumferential sealing sleeve into which the other of the two connecting branches is extended in a sealing fashion when the ends of the connecting branches are brought into contact to form a connection.

According to the prior art device, it can also be particularly provided in the invention that the closing members are each respectively seated in a circular sealing bead which form a component part of the edge seal and have a cross sectional configuration at the annular end face of the connecting branch so that the end face of the connecting branch is covered by the sealing bead which simultaneously engages a periphery of the closing member in a tight condition when the member is in the closed position and the other connecting branch is not pressed thereagainst. The end surface of this sealing bead, when not engaged with the end surface of the other connecting branch, faces away from the connecting branch in an obliquely radially outward direction toward the other branch. The sealing surfaces comprise an outward bevel toward the respective other socket that a butt chamber is formed therebetween substantially before the contacting and during the decontacting of the two closing members given an approach and/or removal of the end faces of the two connecting branches toward and, respectively, away from one another.

As in the prior art device, it can be particularly provided in the invention that the blower means and the extraction means are arranged at the pipe connection that carries the active closing member.

The invention is based on the surprising perception that one succeeds in achieving a faultless cleaning of the closing members of deposits, particularly of the refilled product, in that, given the assistance of the claimed sealing sleeve, a reliable sealing of the butt chamber is assured both before the contacting of the closing members and the decontacting of the closing flaps after a refilling event. For example, deposited particles can thereby be returned to the product stream while avoiding any and all environmental pollution.

The seals allocated to the closing members are inventively modified over the prior art so that these seals, given a spacing between the closing member of preferably less than 15 mm apart, seal the space allocated between the closing members, i.e., the butt chamber from the outside except for the region of the bearing shells. The centering pin situated in the active closing member toward the drive side is preferably fashioned as an air nozzle and comprises an air outlet opening that proceeds in the direction of the contaminated sealing line between the closing members and the seal. As a result thereof, two essentially tangentially proceeding, hemi-annular or semi-annular streams are generated that meet at the side lying diametrically opposite the drive or valve actuator, namely at the location that is no longer covered by the edge seal. An extraction nozzle that captures the arriving, contaminated blast air and supplies it to the central extraction is preferably located at this position.

Other advantages and features of the invention will be readily apparent from the following description of the preferred embodiments, the drawings and claims.

DESCRIPTION OF THE PREFERRED EMBODIMENTS

Figure 1:
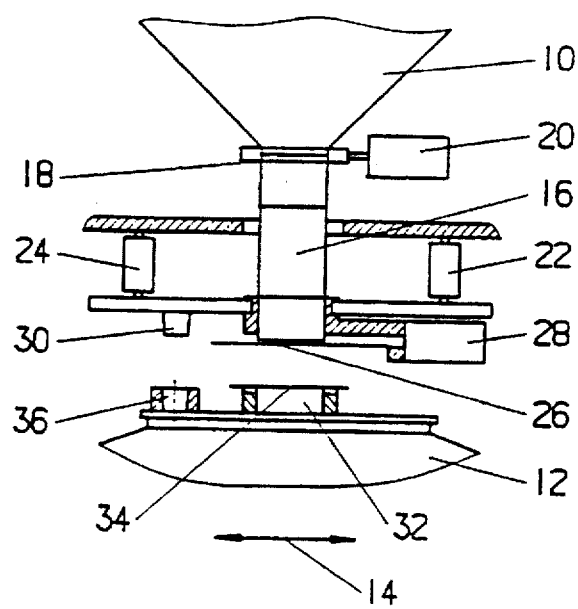
FIG. 1 is a cross sectional view along a central axis of two connecting branches which are to be coupled together with portions shown in elevation and shown in a yet uncoupled condition.

The principles of the present invention are particular useful when incorporated in an apparatus or device for coupling a container 10 to a container 12 to allow transfer of product therebetween. The container 10 is a stationary container, whereas the container 12, as illustrated, is a transport container that can be moved under the stationary container 10 from a side in the direction of double-arrow 14.

At a lower end, the container 10 has a branch connection or pipe socket 16 that is in communication relative to the internal volume of the container 10 by a valve means 18 that can be opened and closed with a valve actuator 20. The branch connection 16 is adjustable in height with regard to a support structure by pneumatic cylinders 22 and 24. A first closing flap or member 26 is located at what is the lower end of the branch connection 16 in FIG. 1, and this closing member 26, as shall be explained later, can be moved by an actuator drive 28 from a closed position that closes the end opening of the branch connection 16 at the bottom of FIG. 1 into an opened position upon a 90° rotation around a rotational axis that lies in a transverse direction to the axis of the branch connection or socket 16.

Also illustrated in FIG. 1 is a centering pin 30, which is connected to a plate attached to the branch connection 16. As explained hereinafter, this centering pin 30 coacts with a centering socket or bore 36, which is arranged with a branch connection 32 for the container 12.

On its upper side or end, the container 12 moves under the container 10 by a lateral displacement in the direction of the double-arrow 14 of FIG. 1. The container 12 has a second connecting branch or socket 32 complementary to the first branch connection 16, which carries a second closing member 34 on its end face facing toward the container 10. The second closing member 34, as shall be explained below, is capable of being brought from a closed position into an open position by a 90° rotation on an axle in way similar to the first closing member 26. The centering bore or socket 36 on the container 12 is intended to interreact with the centering pin 30 of the first connecting branch 16. Fine-centering mechanisms in the form of at least one additional centering pin and at least one further centering bore or socket interacting therewith are provided on each of the closing members, and these enable an exact mutual centering of the first closing member 26 and the second closing member 34 after the rough centering as a result of the interaction of the centering pin 30 with the centering bore 36.

Figure 3:
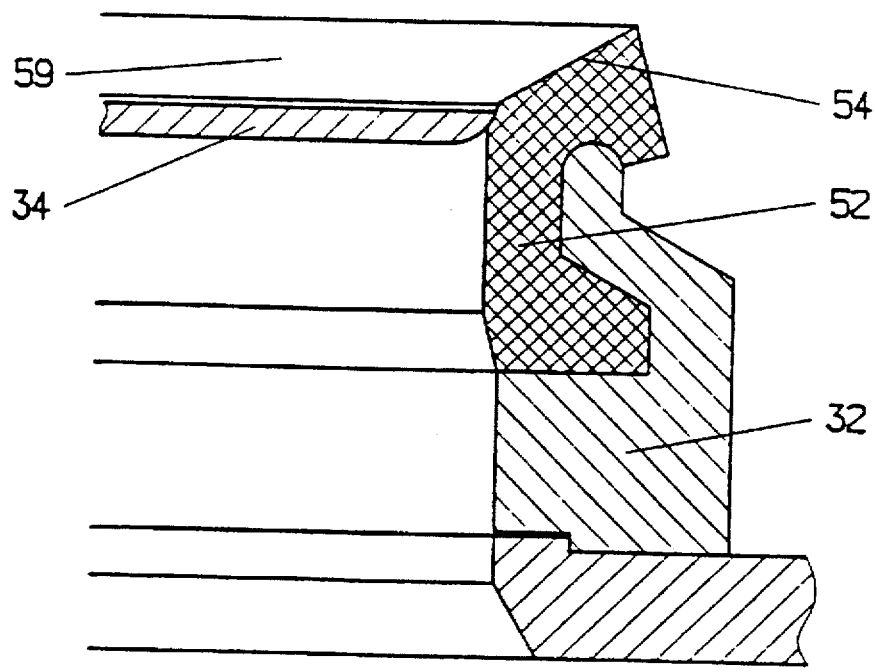
FIG. 3 is a partial longitudinal cross sectional view corresponding to FIG. 2 of an edge seal prior to any engagement with a corresponding branch connection.
Figure 4:
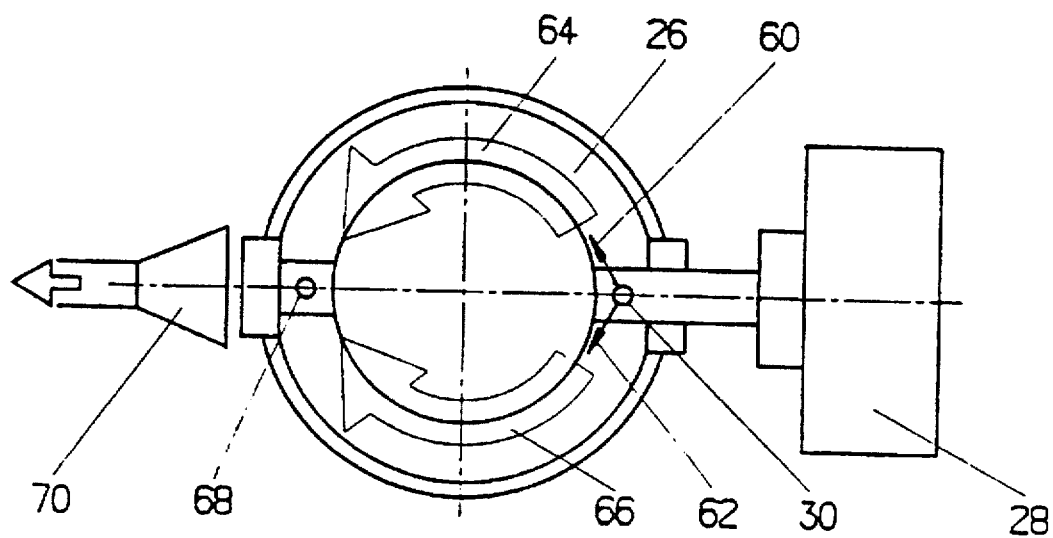
FIG. 4 is a plan view of a closing flap of a branch connection of the device of the present invention as illustrated from the other branch connection.

FIG. 3 shows the closing member 34 of the second connecting branch 32 being sealed on its circumferential edge by a sealing bead 52 when the branch 32 is not engaged with a first branch 16. The sealing bead 52, which is two substantially semi-circular members extending between the bearing half-shells, comprises an obliquely radially outwardly ascending, annular end sealing surface 54. In a similar way, the connecting branch 16 has an annular sealing bead 58 having an annular end sealing surface 56 and, when not engaged with a sealing bead of another branch, this engages the circumferential or peripheral edge of the closing flap or member 26.

Figure 2:
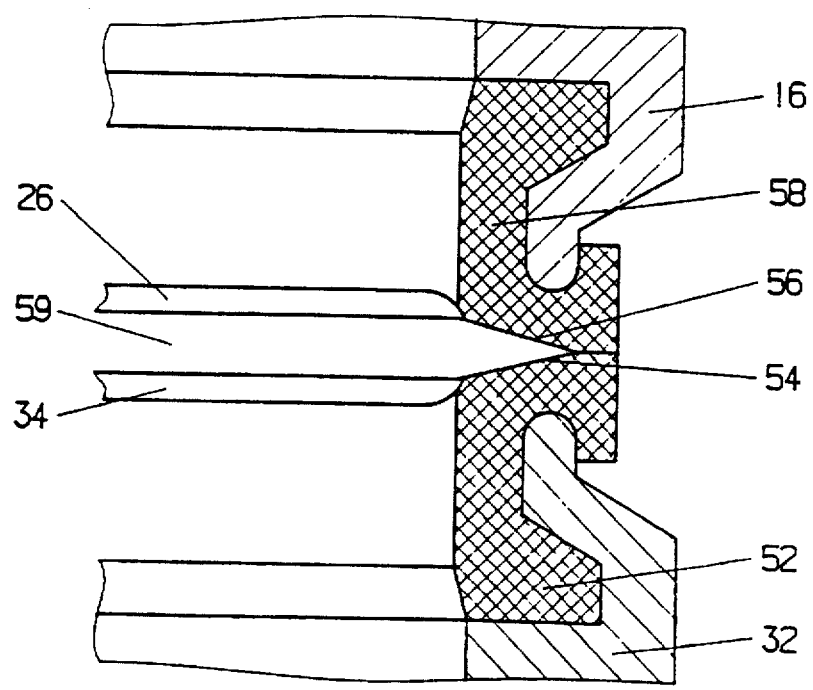
FIG. 2 is a partial longitudinal cross sectional view of edge seals of two connecting branches in a yet uncoupled condition.

When, as shown in FIG. 2, the first branch connection 16 is brought against the second branch connection 32, then the end sealing surface 54 of the sealing bead 52 comes into contact with the end sealing surface 56 of the sealing bead 58 at an outer circumferential edge due to the oblique positioning of the end sealing surfaces 54 and 56. Accordingly, a butt chamber 59 is sealed in a condition wherein the closing members 26 and 34 do not yet lie against one another so that an appropriate cleaning of the butt chamber 59 with a blower means, which is yet to be described, can occur in this condition, i.e., when the branch connections 16 and 32 approach one another or when, correspondingly, they are being moved apart during an uncoupling after a transfer or filling event has occurred.

In order to provide a flow of air, which is either a protective gas or a cleaning gas, a blower means is provided and has two air outlets in a centering pin, such as 30, so that openings 60 and 62 create two tangential hemi-annularly proceeding air streams 64 and 66 adjacent the surface of the closing member 26. These proceed to an extraction nozzle 68 lying opposite the centering pin 30, which is connected to a central extraction 70 for removal.

Figure 5:
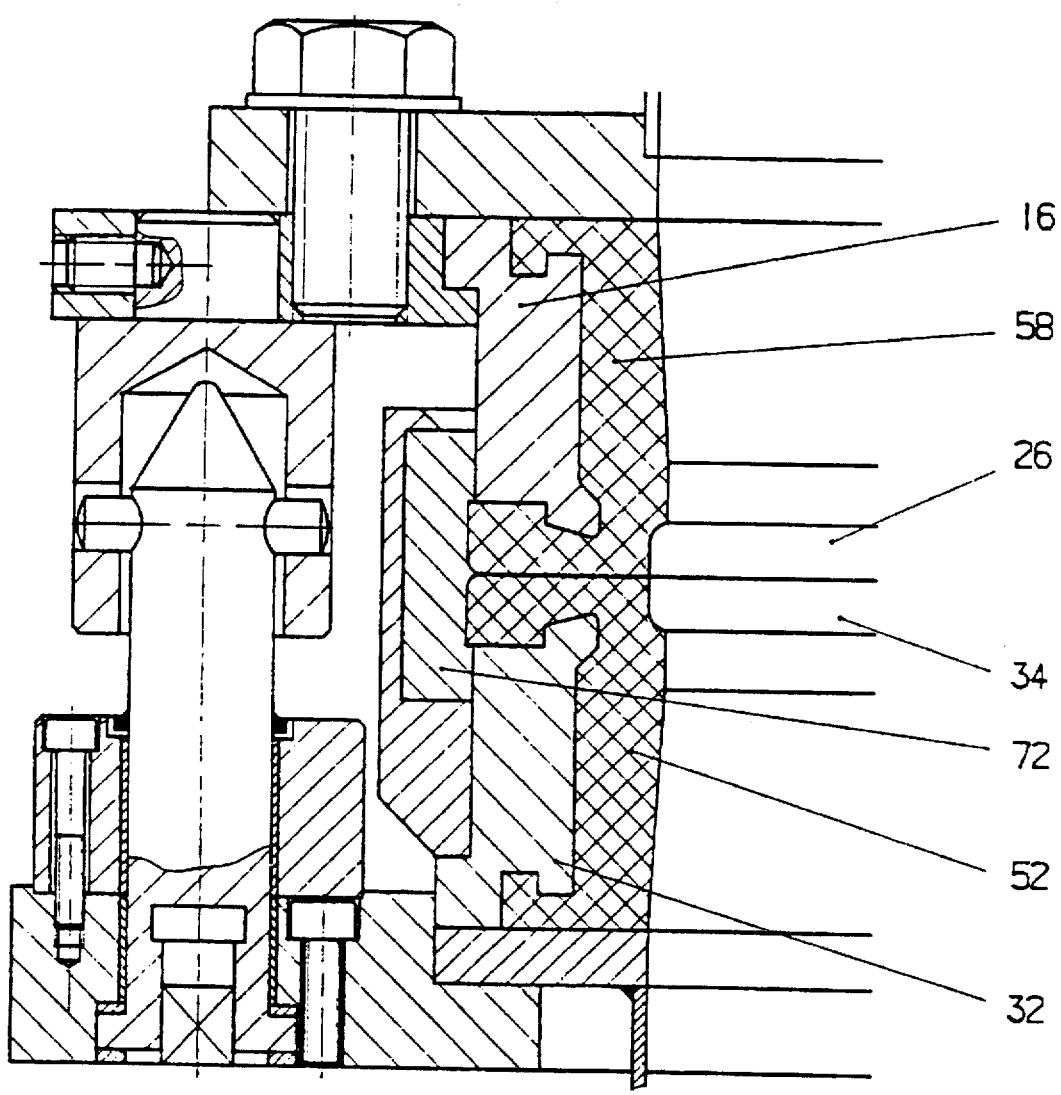
FIG. 5 is a partial longitudinal cross sectional view corresponding to FIG. 2 of the two branch connections coupled to one another in a further exemplary embodiment of the present invention.

According to the present invention, a circumferential sealing sleeve 72, which is formed by two half-cylinders and are attached to a branch connection 32, is provided in the exemplary embodiment, as illustrated in FIG. 5. This provides a sealing immersion of the connecting branch 16 in a function condition in which the closing members 26 and 34 have not yet come together or during a decoupling do not lie against one another. Thus, the butt chamber 59, which is formed between the sealing beads 52 and 58 when they are not compressed, is sealed with the sealing sleeve 72 without there being any need for a collaboration of the sealing beads 52 and 58 for sealing the butt chamber 59 during the blowing and extraction event. The ends of the two half-cylinders are spaced apart to allow the semiaxles and half-shell bearings to pass during coupling and uncoupling.

As in the allowed U.S. application Ser. No. 08/355,690, which issued as U.S. Pat. No. 5,540,266, when the two connecting branches are brought together, the sealing members 36 and 34 have planar surfaces that contact each other and their semiaxes coact with each other to form a circular axle between the bearing shells of each sealing branch so that the actuator 28, by rotating the closing member 26, entrains the closing member 34 to move therewith.

Although various minor modifications may be suggested by those versed in the art, it should be understood that we wish to embody within the scope of the patent granted hereon all such modifications as reasonably and properly come within the scope of our contribution to the art.

We claim:

1. In a device for coupling two containers for transfer of contents therebetween, said device including a separate connecting branch having essentially a circular cross section for each of the containers, each connecting branch having a closing member having an essentially circular cross section being located adjacent to an end thereof and having an outside diameter essentially corresponding to the inside diameter of the connecting branch, each closing member being rotated through 90° from a closed position wherein the closing member essentially extends transverse relative to the longitudinal middle axis of the connecting branch to an opened position where it is essentially parallel to the longitudinal middle axis of the connecting branch, each of the closing members having a semiaxle being seated by two bearing shells lying opposite one another and complimentary with respect to the semiaxle that opens toward the end face of the respective connecting branch, said end faces being aligned in a closed position with the end face of the respective connecting branch and being seated therein with the respective semiaxle, which have an essentially semicircular cross section with planar end faces, which faces away from the container carrying the connecting branch, and are essentially aligned with the end faces of the closing branch facing away from the container, only the first of the two semiaxles being directly engaged by a valve actuator and with the end faces of the connecting branches being pressed against one another in a centered fashion with the closing member being formed into a combined closing member, the second closing member, which is not directly driven, being entrained to pivot in a bearing formed by the bearing shells and being pivotable between the closed position and the opened position with the first closing member connected to the valve actuator, each of the end faces of the connecting branches having an essentially annular edge seal movable between an extended position to a compressed condition, each of said closing members having a peripheral edge engaged by the annular edge seal when in the extended position and released when the edge seal is compressed to the compressed condition, said closing members and annular edge seals coacting to form a chamber between the closing members as the two branch connections are being brought into and out of engagement, blower means for directing a gas into said chamber, said blower means having extracting means for collecting said gas directed into the chamber, the improvement comprising one of the two branch connections having a circumferential sealing sleeve into which the other of the two branch connections is inserted in a sealing fashion given an approach of the end faces of the two branch connections to one another.

2. In an apparatus according to claim 1, wherein during the approach and removal of the end faces of the two branch connections from one another, the butt chamber is sealed or opened for a distance of about 15 mm prior to contacting or decontacting of the two closing members.

3. In an apparatus according to claim 2, wherein the blower means is at least partially formed by a centering element of one of the connecting branches.

4. In an apparatus according to claim 3, wherein the blower means comprises two gas outlet openings for generating respective essentially semi-annular gas streams.

5. In an apparatus according to claim 4, wherein the blower means and the extraction means are arranged essentially diametrically opposite circumferential positions on said one of the two branch connections.

6. In an apparatus according to claim 1, wherein the blower means is at least partially formed by an element of a centering device on one of the two branch connections.

7. In an apparatus according to claim 6, wherein the blower means comprises two gas outlet openings for generating, respectively, essentially semi-annular gas streams.

8. In an apparatus according to claim 7, wherein the extraction means is arranged essentially diametrically opposite the blower means in said one of the branch connections.

9. In an apparatus according to claim 1, wherein the blower means and extraction means are arranged essentially diametrically opposite circumferential positions on one of said two branch connections.

10. In an apparatus according to claim 1, wherein the blower means comprises two gas outlet openings for generating essentially a semi-annular gas stream.

11. In an apparatus according to claim 10, wherein the extraction means is arranged diametrically opposite the circumferential position of the blower means on said one branch connection.

* * * * *